(12) United States Patent
Ayuzawa et al.

(10) Patent No.: US 9,975,581 B2
(45) Date of Patent: May 22, 2018

(54) VEHICLE BODY STRUCTURE

(71) Applicant: HONDA MOTOR CO., LTD., Tokyo (JP)

(72) Inventors: Shotaro Ayuzawa, Wako (JP); Minoru Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/484,220

(22) Filed: Apr. 11, 2017

(65) Prior Publication Data
US 2017/0297633 A1 Oct. 19, 2017

(30) Foreign Application Priority Data

Apr. 13, 2016 (JP) ................................. 2016-080021

(51) Int. Cl.
B62D 29/00 (2006.01)
B62D 25/02 (2006.01)
B62D 25/20 (2006.01)

(52) U.S. Cl.
CPC ......... B62D 29/005 (2013.01); B62D 25/025 (2013.01); B62D 25/2036 (2013.01)

(58) Field of Classification Search
CPC ............. B62D 29/005; B62D 25/2036; B62D 25/025; B62C 25/2036; B62C 25/025
USPC ....... 296/193.05, 203.03, 193.06, 193.08, 29
See application file for complete search history.

(56) References Cited

U.S. PATENT DOCUMENTS

| 5,619,784 | A  | * | 4/1997  | Nishimoto | ............. B62D 65/04    |
|           |    |   |         |           | 29/430                      |
| 9,187,136 | B1 | * | 11/2015 | Leanza    | ................... B62D 25/20 |
| 2014/0300138 | A1 | * | 10/2014 | Gonda  | ............... B62D 25/2027 |
|           |    |   |         |           | 296/187.12                  |
| 2015/0158532 | A1 | * | 6/2015  | Ayuzawa | ........... B62D 25/2009 |
|           |    |   |         |           | 296/193.07                  |
| 2016/0016358 | A1 | * | 1/2016  | Kulesha | ................. B29C 65/562 |
|           |    |   |         |           | 156/92                      |
| 2016/0214650 | A1 | * | 7/2016  | Ideguchi | .............. B62D 25/145 |
| 2016/0318556 | A1 | * | 11/2016 | Ikeda   | ........................ B60K 1/04 |
| 2016/0347377 | A1 | * | 12/2016 | Minei   | ..................... B29C 65/56 |

FOREIGN PATENT DOCUMENTS

JP 5056956 B2 10/2012

* cited by examiner

*Primary Examiner* — Jason S Morrow
*Assistant Examiner* — E Turner Hicks
(74) *Attorney, Agent, or Firm* — Westerman, Hattori, Daniels & Adrian, LLP (57) ABSTRACT

A metallic joint 18 having a substantially T-shaped cross section configured to join an inner surface in a vehicle width direction of a FRP side wall member 13 extending in a front-rear direction and an outer end in the vehicle width direction of a FRP standing wall member 14 extending in the vehicle width direction includes left-right joining surfaces 18b and 18c joined to an inner surface in the vehicle width direction of the side wall member 13, and a front-rear joining surface 18a which extends inward in the vehicle width direction from an intermediate portion in the front-rear direction of the left-right joining surfaces 18b and 18c and is joined to a front surface or a rear surface of the outer end in the vehicle width direction of the standing wall member 14.

10 Claims, 7 Drawing Sheets

VEHICLE BODY STRUCTURE

CROSS-REFERENCE OF RELATED APPLICATION

This application claims priority of Japanese Patent Application No. 2016-080021 filed in Japan on Apr. 13, 2016, the entire contents of which are incorporated herein by reference.

TECHNICAL FIELD

The present invention relates to a vehicle body structure in which an inner surface in a vehicle width direction of a FRP (fiber/fiberglass reinforced plastic) side wall member extending in a front-rear direction and an outer end in the vehicle width direction of a FRP standing wall member extending in the vehicle width direction are joined to each other by a metallic joint.

BACKGROUND OF THE INVENTION

Japanese patent No. 5056956 described below discloses an vehicle body made of a fiber reinforced resin in which an outer end portion in the vehicle width direction of a partition (back panel) for partitioning a passenger compartment and a rear cargo compartment is fitted into a groove formed between a rear pillar on the front side and a rear side member on the rear side and extending in a vertical direction and is joined by sticking, thereby efficiently transmitting and absorbing a collision load of a side collision from the rear pillar and the rear side member to the partition.

However, in the above-described related art, because the outer end portion of the partition in the vehicle width direction is fitted and stuck into the groove formed between the rear pillar and the rear side member, high component accuracy is required for controlling the groove width, and there is a problem of a decrease in productivity.

SUMMARY OF INVENTION

The present invention has been made in view of the above circumstances, and an object thereof is to rigidly join an FRP side wall member extending in the front-rear direction and a FRP standing wall member extending in the vehicle width direction with a simple structure.

In order to achieve the above object, in a first aspect of the present invention, there is provided a vehicle body structure wherein a metallic joint having a substantially T-shaped cross section configured to join an inner surface in a vehicle width direction of a FRP-made side wall member extending in a front-rear direction and an outer end in the vehicle width direction of a FRP-made standing wall member extending in the vehicle width direction includes left-right joining surfaces joined to an inner surface in the vehicle width direction of the side wall member, and a front-rear joining surface which extends inward in the vehicle width direction from an intermediate portion in the front-rear direction of the left-right joining surfaces and is joined to a front surface or a rear surface of the outer end in the vehicle width direction of the standing wall member.

Further, in a second aspect, in addition to the configuration in the first aspect, there is provided the vehicle body structure, wherein a positioning pin fitted to a positioning hole formed in the side wall member is provided on the left-right joining surface of the joint.

Further, in a third aspect, in addition to the configuration in the first or second aspect, there is provided the vehicle body structure, wherein the standing wall member is formed in a hollow closed cross section, by superimposing and joining a first joining flange formed by bending an outer end in the vehicle width direction of a first skin main body of an inner skin on the inner side in the front-rear direction to the inner side in the front-rear direction, and a second joining flange formed by bending an outer end in the vehicle width direction of a second skin main body of an outer skin on the outer side in the front-rear direction to the inner side in the front-rear direction, the second skin main body is stuck to the front-rear joining surface of the joint, and the second joining flange is stuck to the left-right joining surface of the joint.

Further, in a fourth aspect, in addition to the configuration in the third aspect, there is provided the vehicle body structure, wherein the left-right joining surface of the joint has a first bent portion aligned on the outer side in the vehicle width direction of the second skin main body of the outer skin, and a second bent portion aligned on the outer side in the vehicle width direction of the first skin main body of the inner skin.

Further, in a fifth aspect, in addition to the configuration in the third or fourth aspect, there is provided the vehicle body structure, wherein at least one of the inner skin and the outer skin is formed to be thicker in an outer peripheral portion of the standing wall member than in other portions.

Further, in a sixth aspect, in addition to the configuration in any one of the first to fifth aspects, there is provided the vehicle body structure, wherein the standing member includes a core interposed between the inner skin and the outer skin, and the core includes a plurality of grooves extending in the vehicle width direction.

Further, in a seventh aspect, in addition to the configuration in any one of the first to sixth aspects, there is provided the vehicle body structure, wherein the side wall member has a hollow closed cross section.

Further, in an eighth aspect, in addition to the configuration in any one of the first to seventh aspects, there is provided the vehicle body structure, wherein the side wall member is a front pillar or a rear pillar, and includes a protruding portion protruding outward in the front-rear direction from the joint, and the outer surface in the front-rear direction of the standing wall member and the protruding portion are connected to each other by a bracing member.

Further, in a ninth aspect, in addition to the configuration in the eighth aspect, there is provided the vehicle body structure, wherein the floor panel includes a first mounting surface which stands upward to cover the outer end in the front-rear direction of the side wall member, and s second mounting surface which extends inward in the vehicle width direction and inward in the front-rear direction from the first mounting surface and is joined to the bracing member, and an inner end in the front-rear direction of the side frame extending in the front-rear direction is fastened to the first mounting surface and the second mounting surface.

Further, a rear pillar 13 of one embodiment corresponds to the side wall member of the present invention, a back panel 14 of one embodiment corresponds to the standing wall member of the present invention, a rear side frame 15 of one embodiment corresponds to the side frame of the present invention, a first wall portion 18*a* of one embodiment corresponds to the front-rear joining surface of the present invention, a second wall portion 18*b* of one embodiment corresponds to the left-right joining surface of the present invention, and a third wall portion 18c of the present invention corresponds to the left-right joining surfaces of the present invention.

EFFECT OF THE INVENTION

According to the configuration in the first aspect, a metallic joint having a substantially T-shaped cross section configured to join an inner surface in a vehicle width direction of a FRP side wall member extending in a front-rear direction and an outer end in the vehicle width direction of a FRP standing wall member extending in the vehicle width direction includes left-right joining surfaces joined to an inner surface in the vehicle width direction of the side wall member, and a front-rear joining surface which extends inward in the vehicle width direction from an intermediate portion, in the front-rear direction of the left-right joining surfaces and is joined to a front surface or a rear surface of the outer end in the vehicle width direction of the standing wall member. Accordingly, it is possible to rigidly join the side wall member and the standing wall member by increasing the joining area between the side wall member and the standing wall member by the joint. Furthermore, when the collision load due to a side collision is input to the side wall member, the stress of the side wall member and the standing wall member can be alleviated by the deformation of the metallic joint having ductility, and it is possible to prevent the local destruction of the side wall member and the standing wall member.

According to the configuration in the second aspect, since the positioning pin fitted to the positioning hole formed in the side wall member is provided on the left-right joining surfaces of the joint, it is possible to mutually position and join the side wall member and the joint with high accuracy.

According to the configuration in the third aspect, the standing wall member is formed in a hollow closed cross section, by superimposing and joining a first joining flange formed by bending the outer end in the vehicle width direction of the first skin main body of the inner skin on the inner side in the front-rear direction inward in the front-rear direction, and a second joining flange formed by bending the outer end in the vehicle width direction of the second skin main body of the outer skin on the outer side in the front-rear direction inward in the front-rear direction, the second skin main body is stuck to the front-rear joining surface of the joint and the second joining flange is stuck to the left-right joining surface of the joint. Accordingly, it is possible to enhance the strength and rigidity by setting the standing wall member to have a hollow closed cross section. Further, the second skin main body and the second joining flange of the outer skin are continuously joined to the front-rear joining surface and the left-right joining surface by the joint to further enhance the joining strength.

Further, according to the configuration in the fourth aspect, the left-right joining surface of the joint has a first bent portion aligned on the outer side in the vehicle width direction of the second skin main body of the outer skin, and a second bent portion aligned on the outer side in the vehicle width direction of the first skin main body of the inner skin. Accordingly, it is possible to efficiently transmit and disperse the collision load of the side collision from the side wall member to the standing wall member via the joint, while reducing the weight by reducing the thickness of the joint.

According to the configuration in the fifth aspect, since at least one of the inner skin and the outer skin is formed to be thicker in an outer peripheral portion of the standing wall member than other portions, it is possible to reduce the weight of the standing wall member by the thin central portion, while preventing the destruction of the standing wall member due to stress concentration, by transmitting and dispersing the collision load of the side collision along the thick outer peripheral portion of the standing wall member.

According to the configuration in the sixth aspect, the standing member includes a core interposed between the inner skin and the outer skin, and the core includes a plurality of grooves extending in the vehicle width direction. Accordingly, it is possible to efficiently support the collision load of the side collision by the standing wall member to enhance absorption effect of the collision energy.

Further, according to the configuration in the seventh aspect, since the side wall member has a hollow closed cross section, it is possible to efficiently absorb the collision load of the side collision by crushing the side wall member on the hollow closed cross section.

Further, according to the configuration in the eighth aspect, the side wall member is a front pillar or a rear pillar, and includes a protruding portion protruding outward in the front-rear direction from the joint, and the outer surface in the front-rear direction of the standing wall member and the protruding portion are connected to each other by a bracing member. Accordingly, by transmitting some of the collision load of the side collision from the side wall member to the standing wall member via the bracing member, it is possible to disperse the input path of the collision load to the standing wall member and to suppress the occurrence of local stress.

According to the configuration in the ninth aspect, the floor panel includes a first mounting surface which stands upward to cover the outer end in the front-rear direction of the side wall member, and a second mounting surface which extends inward in the vehicle width direction and inward in the front-rear direction from the first mounting surface and is joined to the bracing member, and an inner end in the front-rear direction of the side frame extending in the front-rear direction is fastened to the first mounting surface and the second mounting surface. Therefore, it is possible to enhance the supporting rigidity of the side f tame by fastening the side frame across the mutually intersecting two surfaces of the floor panel, and it is possible to further enhance the supporting rigidity of the side frame, by dispersing the load input from the side frame into to the side wall member and the bracing member.

DETAILED DESCRIPTION OF THE INVENTION

First Embodiment

An embodiment of the present invention will be described below with reference to FIGS. 1 to 7. Further, a front-rear direction, a left-right direction (vehicle width direction) and a vertical direction in this specification are defined on the basis of an occupant seated in a driver's seat.

Figure 1:
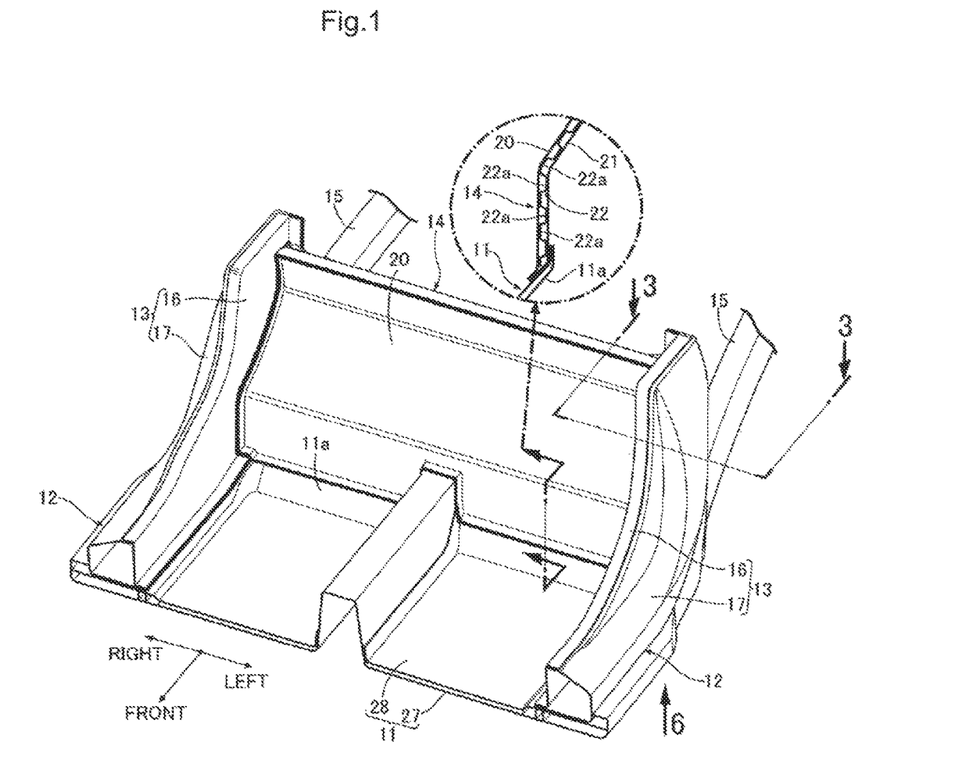
FIG. 1 is a perspective view of a rear portion of a vehicle body of an automobile.

As illustrated in FIG. 1, an vehicle body basically made of carbon fiber reinforced resin (CFRP) includes a pair of left and right side sills 12 and 12 extending in the front-rear direction along both left and right side portions of a floor panel 11, and a pair of left and right rear pillars 13 and 13 which stand rearward and upward from the rear ends of the side sills 12 and 12 of the floor panel 11. The left and right side edges of the back panel 14 standing up from the rear end of the floor panel 11 is joined to the inner surface of the left and right rear pillars 13 and 13 in the vehicle width direction. A pair of left and right metal rear side frames 15 and 15 extends rearward from the rear ends of the left and right side sills 12 and 12.

Figure 2:
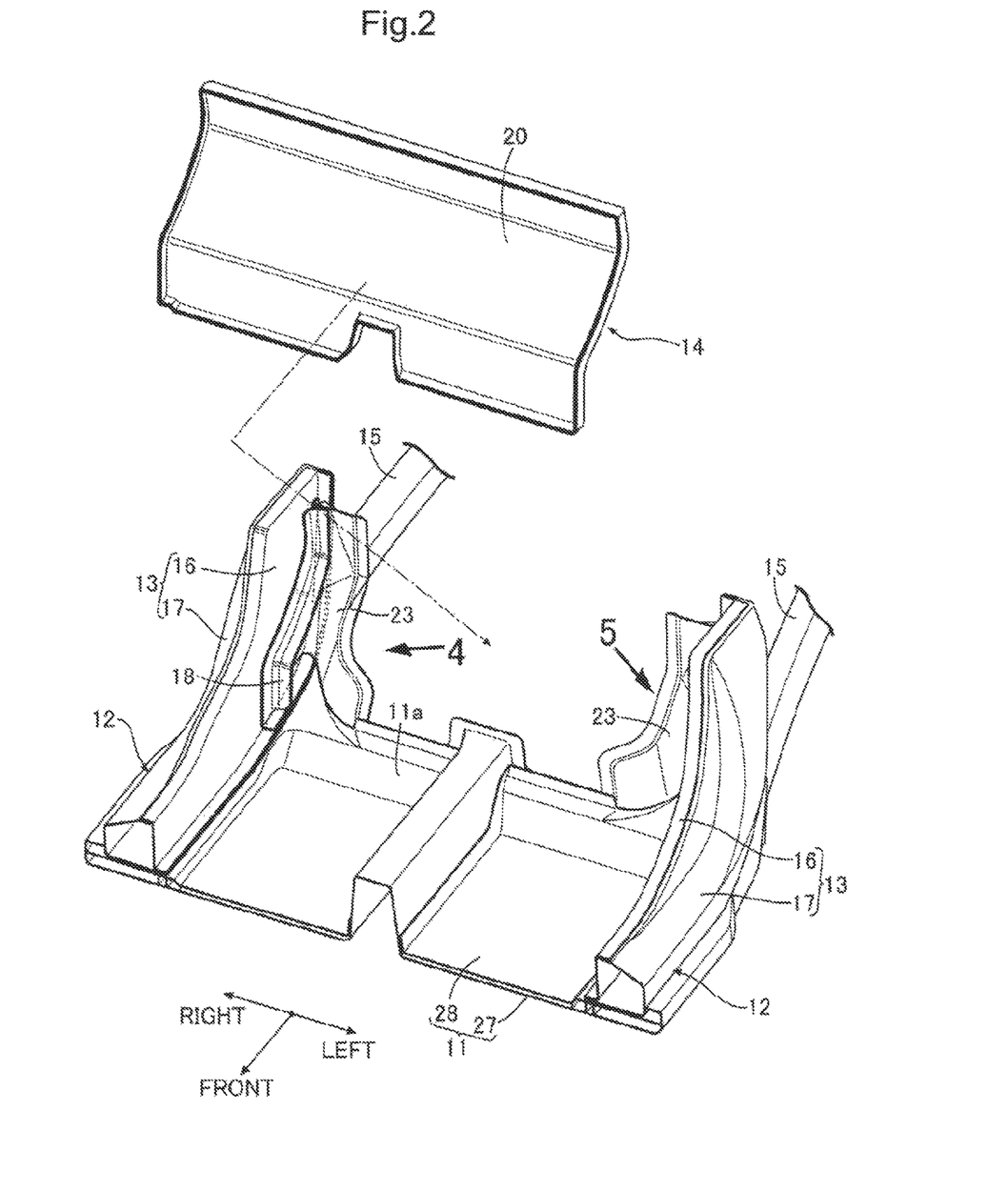
FIG. 2 is a diagram illustrating a state in which a back panel is detached from FIG. 1.
Figure 3:
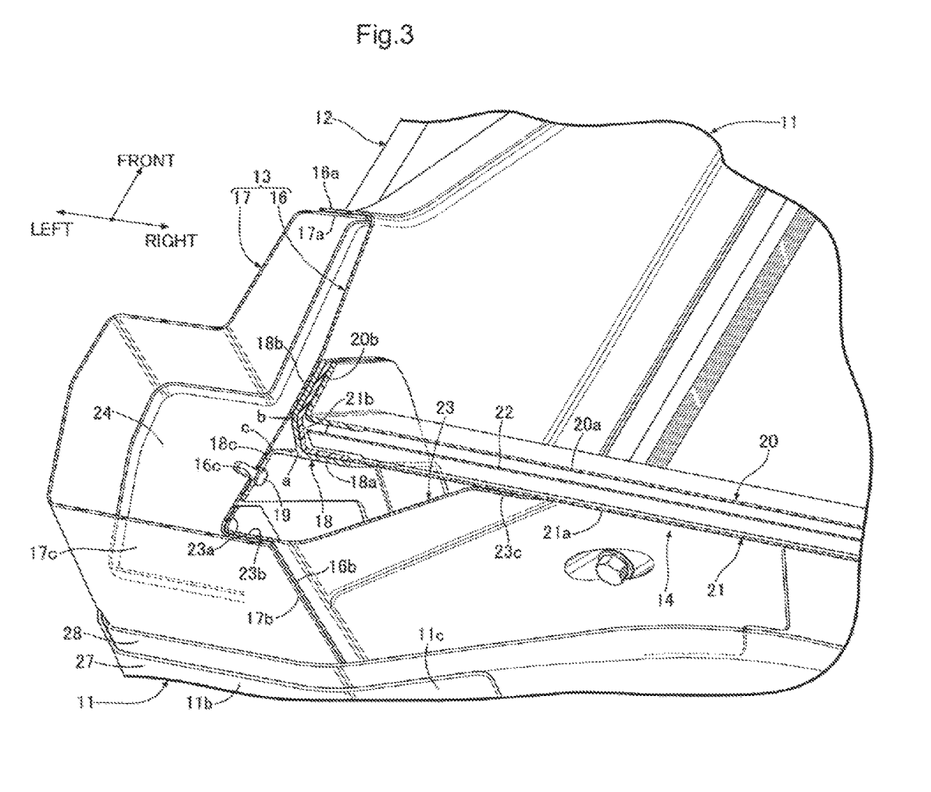
FIG. 3 is a cross-sectional view taken along a line 3-3 of FIG. 1.

As illustrated in FIGS. 2 and 3, the rear pillar 13 is formed in a hollow closed cross section by joining the front and rear joining flanges 16a and 16b of the inner member 16 and the front and rear joining flanges 17a and 17b of the outer member 17, and a metallic joint 18 is stuck to the inner wall in the vehicle width direction of the substantially flat inner member 16. An outer peripheral portion of a bulkhead 24 disposed in a horizontal plane is connected to an inner peripheral portion of the rear pillar 13 having a hollow closed cross section.

The joint 18 is a member having a substantially T-shaped constant cross section and bent in a crank shape, and the horizontal cross section thereof includes a first wall portion 18a extending in the vehicle width direction, a second wall portion 18b which obliquely extends outward and forward in the vehicle width direction from the vicinity of the outer end of the first wall portion 18a in the vehicle width direction, then is bent and extends forward, and a third wall portion 18c which is bent from the outer end of the first wall portion 18a in the vehicle width direction and extends rearward. The second wall portion 18b and the third wall portion 18c are stuck to the inner member 16 of the rear pillar 13, except for a portion having the triangular cross section that includes a first bent portion a in which the second wall portion 18b diverges from the first wall portion 18a, a second bent portion b in which the second wall portion 18b is bent in an intermediate portion, and a third bent portion c in which the third wall portion 18c diverges from the first wall portion 18a.

In order to position the joint 18 with respect to the inner member 16, two upper and lower positioning pins 19 and 19 (see FIGS. 3 and 5) provided on the third wall portion 18c of the joint 18 are fitted to the positioning holes 16c and 16c of the inner member 16.

The back panel 14 is constituted by sandwiching a corrugated core 22 having a large number of grooves 22a (see FIG. 1) extending in the vehicle width direction between a front inner skin 20 and a rear outer skin 21. The inner skin 20 includes a first skin main body 20a, and a first joining flange 20b formed by bending the outer end portion of the first skin main body 20a in the vehicle width direction forward. The outer skin 21 includes a second skin main body 21a, and a second joining flange 21b formed by bending the outer end portion of the second skin main body 21a in the vehicle width direction forward. The outer peripheral portions of the inner skin 20 and the outer skin 21 of the rectangular back panel 15 are formed to be thicker than other portions. Therefore, the first and second joining flanges 20b and 21b of the inner skin 20 and the outer skin 21 and their vicinities are also thicker, and the thickened portion of the outer skin 21 is stuck to the front surface of the first wall portion 18a of the joint 18 and the inner surface of the second wall portion 18b in the vehicle width direction (see FIG. 3).

The inner skin 20 and the outer skin 21 of the back panel 14 are formed by laminating prepregs or preforms of carbon fiber and by solidifying them with a synthetic resin, and the thick portion is configured to have high strength, by making the laminated number of prepregs or preforms larger than other portions, and by making the orientation directions of the carbon fibers different from each other to impart quasi-isotropy.

The first bent portion a of the second wall portion 18b of the joint 18 is aligned on the outer side in the vehicle width direction of the second skin main body 21a of the outer skin 21, and the second bent portion b of the second wall portion 18b of the joint 18 is aligned on the outer side in the vehicle width direction of the first skin main body 20a of the skin 20.

Figure 4:
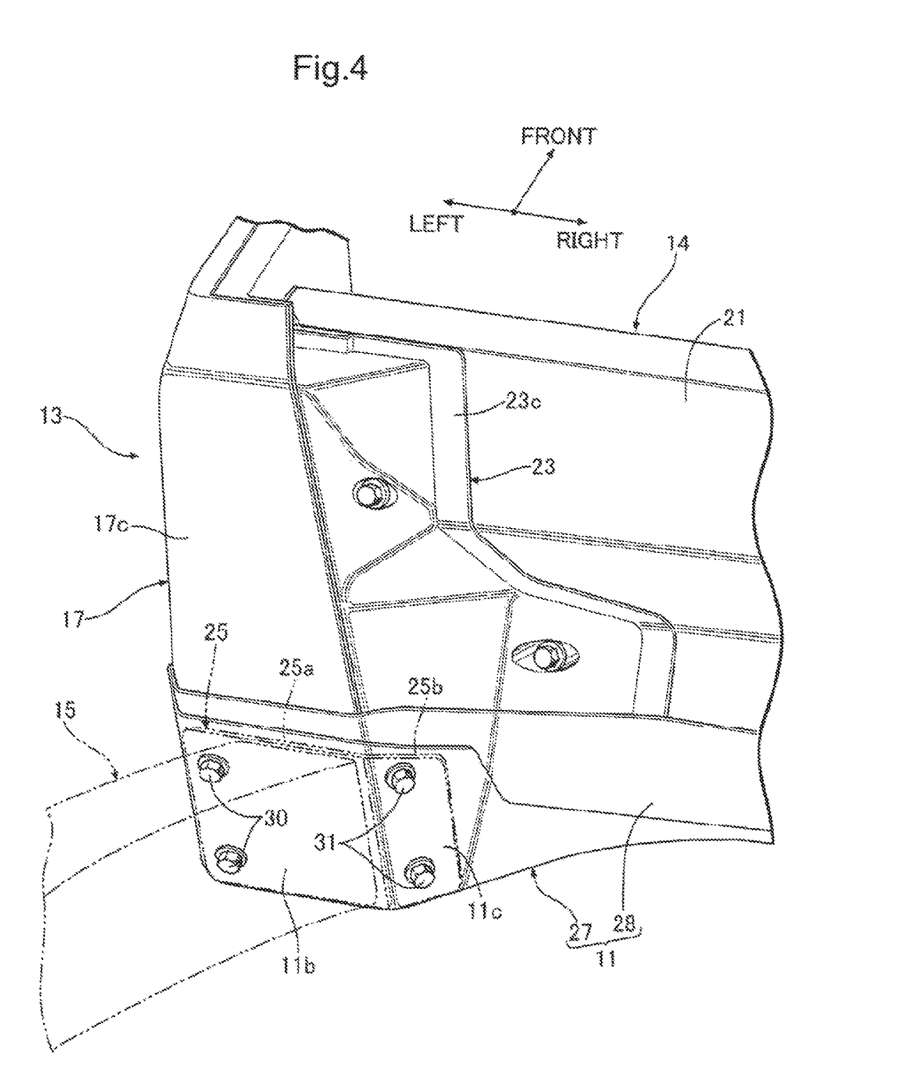
FIG. 4 is a diagram taken in a direction of an arrow 4 of FIG. 2.
Figure 5:
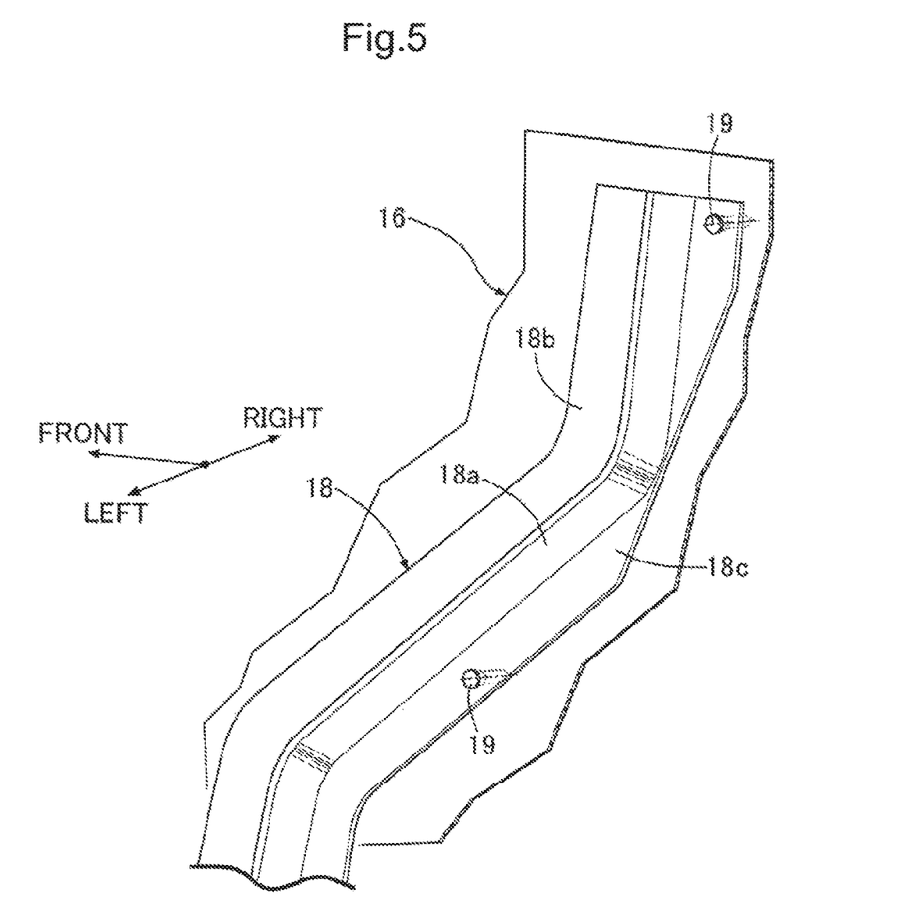
FIG. 5 is a diagram taken in a direction of an arrow 5 of FIG. 2.

As illustrated in FIGS. 3 and 4, the rear portion of the outer member 17 of the rear pillar 13 protrudes rearward from the back panel 14 and forms a protruding portion 17c continuous with the joining flange 17b. A bracing member 23 made of an L-shaped plate material in a rear view includes a joining flange 23a at the outer end in the vehicle width direction, and a joining flange 23c at the inner end in the vehicle width direction. The joining flange 23a at the outer end in the vehicle width direction is stuck to the inner surface of the inner member 16 of the rear pillar 13 in the vehicle width direction. The joining portion 23b continuous to the joining flange 23a is stuck to the joining flange 17b of the outer member 17 across the joining flange 16b of the inner member 16 of the rear pillar 13. The joining flange 23c at the inner end in the vehicle width direction of the bracing member 23 is stuck to the rear surface of the second skin main body 21a of the outer skin 21 of the back panel 14. Accordingly, the outer skin 21 of the back panel 14, the inner member 16 of the rear pillar 13 and the bracing member 23 cooperatively constitute a substantially triangular hollow closed cross section.

Figure 6:
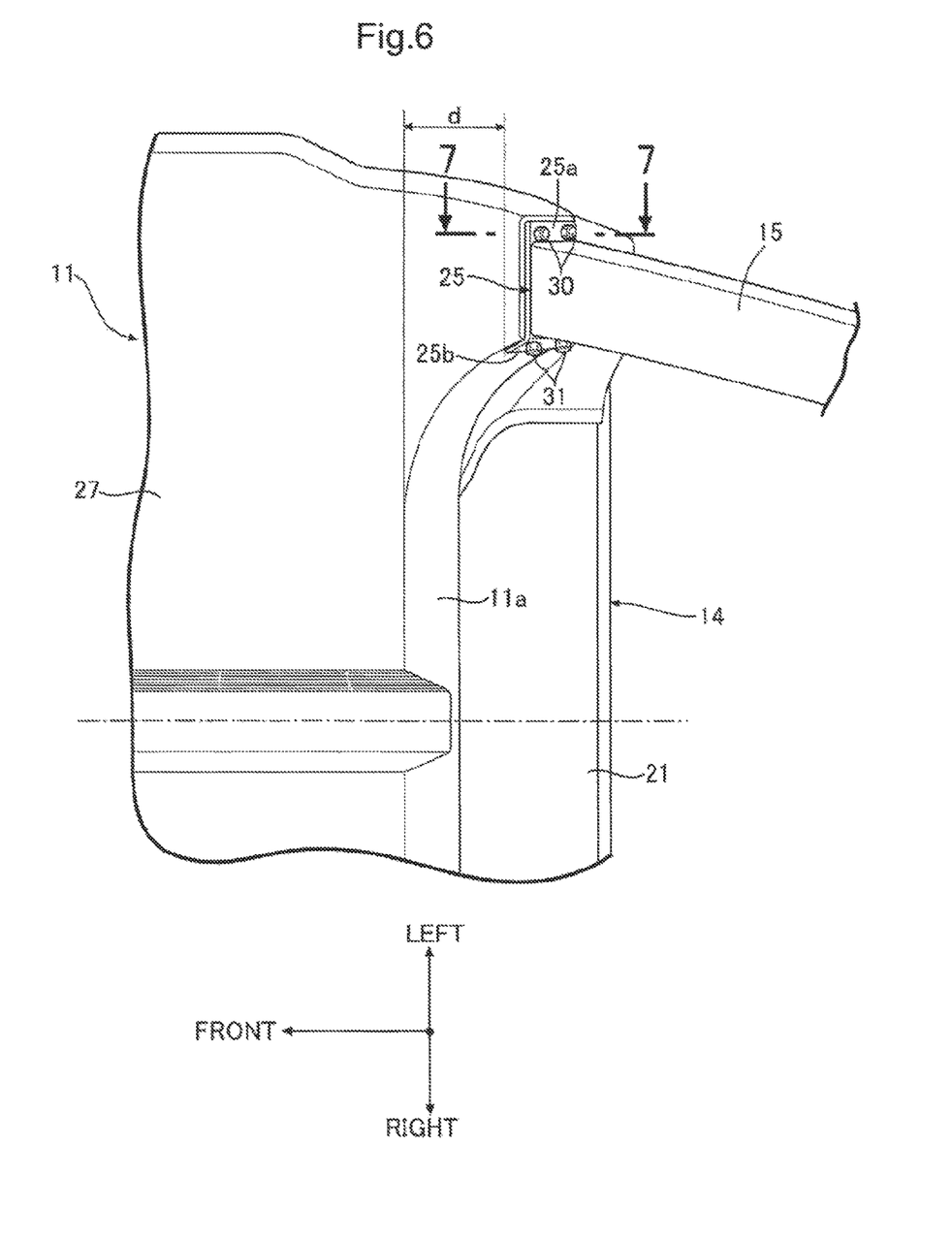
FIG. 6 is a diagram taken in a direction of an arrow 6 of FIG. 1.
Figure 7:
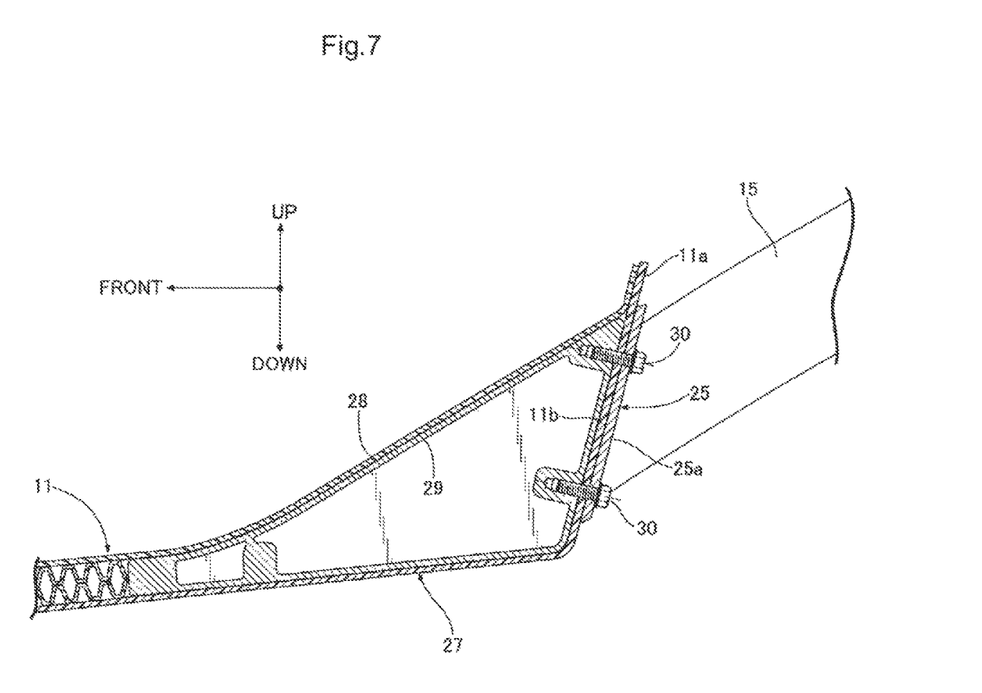
FIG. 7 is a cross-sectional view taken along a: line 7-7 of FIG. 6.

As illustrated in FIGS. 4, 6 and 7, a pair of right and left metal rear side frames 15 and 15 arranged at the vehicle body rear portion in the front-rear direction is provided with plate-like mounting flanges 25 and 25 at the front ends thereof. The mounting flange 25 includes a main body portion 25a to which the rear side frame 15 is joined, and an inclined portion 25b which is inclined forward from the inner end in the vehicle width direction of the main body portion 25a and inward in the vehicle width direction.

The floor panel 11 is provided with a lower outer skin 27 and an upper inner skin 28. The floor panel 11 has an inclined portion 11a extending rearward and upward which is formed in the central portion in the vehicle width direction of the rear end of the floor panel 11 interposed between the left and right side sills 12 and 12, and the lower end of the back panel 14 is stuck to the front surface of the inclined portion 11a (see FIG. 1). Both end portions in the vehicle width direction of the rear end of the floor panel 11 protrude rearward by a distance d (see FIG. 6) from the central portion in the vehicle width direction and overlap the rear surfaces of the left and right rear pillars 13 and 13. In this portion, a metallic reinforcing member 29 (see FIG. 7) is embedded between the lower outer skin 27 and the upper inner skin 28 of the floor panel 11. On the floor panel 11 facing the rear end of the reinforcing member 29, a first mounting surface 11b facing rearward and a second mounting surface 11c facing rearward and inward in the vehicle width direction are formed. Two bolts 30 and 30 penetrating the main body portion 25a of the mounting flange 25 of the rear side frame 15 and the first mounting surface 11b of the floor panel 11 from the rear part are screwed with the reinforcing member 29, and two bolts 31 and 31 obliquely penetrating the inclined portion 25b of the mounting flange 25 of the rear side frame 15 and the second mounting surface 11c of the floor panel 11 from the rear part are screwed with the reinforcing member 29. Thus, the rear side frame 15 is fixed to the rear portion of the rear pillar 13.

Next, the operation of the embodiment of the present invention having the above configuration will be described.

A metallic joint 18 having a T-shaped cross section, which connects the inner member 16 of the rear pillar 13 made of CFRP extending in the front-rear direction and the outer end portion in the vehicle width direction of the back panel 14 made of CFRP extending in the vehicle width direction, has a first wall portion 18a to which the rear surface of the first skin main body 20a of the outer skin 21 of the back panel 14 is stuck, a second wall portion 18b which is stuck to the outer surface in the vehicle width direction of the second joining flange 21b of the outer skin 21 of the back panel 14 and the inner surface in the vehicle width direction of the inner member 16 of the rear pillar 13, and a third wall portion 18c which is stuck to the inner surface in the vehicle width direction of the inner member 16 of the rear pillar 13. Accordingly, it is possible to rigidly stick the rear pillar 13 and the back panel 14, by increasing a sticking area between the rear pillar 13 and the back panel 14 by the joint 18. Furthermore, when the collision load due to a side collision is input to the rear pillar 13, the stress of the rear pillar 13 and the back panel 14 can be alleviated by the deformation of the metallic joint 18 having ductility, and it is possible to prevent the local destruction of the rear pillar 13 and the back panel 14.

Further, since the positioning pins 19 and 19 provided on the third wall portion 18c of the joint 18 are fitted to the positioning holes 16c and 16c of the inner member 16 of the rear pillar 13, the joint 18 can be precisely positioned with respect to the rear pillar 13.

The back panel 14 is formed in a hollow closed cross section, by superimposing and sticking the first joining flange 20b formed by bending the outer end in the vehicle width direction of the first skin main body 20a of the front inner skin 20 to the front side, and the second joining flange 21b formed by bending the outer end in the vehicle width direction of the second skin main body 21a of the rear outer skin 21 to the front side. Further, the second skin main body 21a is stuck to the first wall portion 18a of the joint 18 and the second joining flange 21b is stuck to the second wall portion 18b of the joint 18. Accordingly, it is possible to enhance the strength and rigidity by setting the back panel 14 to have a hollow closed cross section. Further, the second skin main body 21a and the second joining flange 21b of the outer skin 21 are continuously stuck to the first wall portion 18a and the second wall portion 18b of the joint 18 to further enhance the sticking strength.

Moreover, the second wall portion 18b of the joint 18 has a first bent portion a aligned on the outer side in the vehicle width direction of the second skin main body 21a of the outer skin 21, and a second bent portion b aligned on the outer side in the vehicle width direction of the first skin main body 20a of the inner skin 20. Accordingly, it is possible to efficiently transmit and disperse the collision load of the side collision from the side wall member to the back panel 14 via the joint 18, while reducing the weight by reducing the thickness of the joint 18.

Since the outer peripheral portions of the inner skin 20 and the outer skin 21 of the back panel 14 are formed to be thicker than the other portions, it is possible to transmit and disperse the collision load of the side collision along the thick outer peripheral portion of the back panel 14, and it is possible to reduce the weight of the back panel 14 by the thin central portion, while preventing the back panel 14 from being destroyed due to stress concentration. Further, the back panel 14 includes a core 22 interposed between the inner skin 20 and the outer skin 21, and since the core 22 includes a plurality of grooves 22a extending in the vehicle width direction, it is possible to efficiently support the collision load of the side collision by the back panel 14 to enhance the absorption effect of the collision energy.

Further, since the rear pillar 13 is formed in a hollow closed cross section and the bulkhead 24 is provided inside the rear pillar 13, it is possible to efficiently absorb the collision load of the side collision by crushing the rear pillar 13 of the hollow closed cross section.

Further, since the outer member 17 of the rear pillar 13 has a protruding portion 17c protruding rearward from the joint 18, and the rear surface of the outer skin 21 of the back panel 14 and the protruding portion 17c are connected by the bracing member 23, by transmitting some of the collision load of the side collision from the rear pillar 13 to the back panel 14 via the bracing member 23, it is possible to disperse the input path of the collision load to the back panel 14 and to suppress the occurrence of local stress.

Further, the floor panel 11 has a first mounting surface 11b which stands upward to cover the rear end of the rear pillar 13, and a second mounting surface 11c which extends obliquely forward from the first mounting surface 11b and is joined to the bracing member 23. The main body portion 25a and the inclined portion 25b of the mounting flange 25 of the front end of the rear side frame 15 extending in the front-rear direction are fastened to the first mounting surface 11b and the second mounting surface 11c with the bolts 30 and 30 and the bolts 31 and 31, respectively. Therefore, it is possible to enhance the supporting rigidity by fastening the rear side frame 15 across the mutually intersecting two surfaces of the floor panel 11, and it is possible to further enhance the supporting rigidity of the rear side frame 15, by dispersing the load input from the rear side frame 15 into the rear pillar 13 and the bracing member 23.

Although the embodiments of the present invention have been described above, it is possible to make various design changes of the present invention within a scope that does not depart from the gist thereof.

For example, the FRP of the present invention is not limited to the CFRP of the embodiment, and may be another type of FRP such as glass fiber reinforced resin (GFRP).

Further, the side wall member of the present invention is not limited to the rear pillar 13 of the embodiment, but may be a front pillar, and the standing wall member of the present invention is not limited to the back panel 14 of the embodiment, but may be a dash panel.

In the embodiment, the thickness of the outer peripheral portion of both the inner skin 20 and the outer skin 21 of the back panel 14 is large, but the thickness of the outer peripheral portion of only one of the inner skin 20 and the outer skin 21 may be large.

DESCRIPTION OF REFERENCE NUMERALS 11 floor panel
11b first mounting surface
11c second mounting surface
13 rear pillar (side wall member)
14 back panel (standing wall member)
15 rear side frame (side frame)
16c positioning hole
17c protruding portion
18 joint
18a first wall portion (front-rear joining surface)
18b second wall portion (left-right joining surface)
18c third wall portion (left-right joining surface)
19 positioning pin
20 inner skin
20a first skin main body
20b first joining flange
21 outer skin
21a second skin main body
21b second joining flange
22 core
22a groove
23 bracing member
a first bent portion
b second bent portion

The invention claimed is:

1. A vehicle body structure comprising:
a side wall member made of FRP, extending in a front-rear direction, and having an inner surface in a vehicle width direction;
a standing wall member made of FRP, extending in the vehicle width direction, and having an outer end in the vehicle width direction; and
a metallic joint configured to join the inner surface of the side wall member and the outer end of the standing wall member and having a substantially T-shaped cross section such that the metallic joint comprises,
a left joining surface and a right joining surface each joined to the inner surface of said side wall member, and
a front-rear joining surface which extends inward in the vehicle width direction from an intermediate portion in the front-rear direction of said left and right joining surfaces and is joined to a front surface or a rear surface of the outer end of said standing wall member,
wherein said standing wall member is composed of an inner skin having a first skin main body and an outer skin having second skin main body such that said standing wall member is formed in a hollow closed cross section by superimposing and joining a first joining flange of the first skin main body and a second joining flange of the second skin main body, the first joining flange being formed by bending an outer end in the vehicle width direction of the first skin main body of the inner skin on an inner side in the front-rear direction to the inner side in the front-rear direction, the second joining flange being formed by bending an outer end in the vehicle width direction of the second skin main body of the outer skin on an outer side in the front-rear direction to the inner side in the front-rear direction, said second skin main body being stuck to the front-rear joining surface of said joint, said second joining flange being stuck to one of the left and right joining surfaces of said joint.

2. The vehicle body structure according to claim 1, wherein a positioning pin fitted to a positioning hole formed in said side wall member is provided on one of the left and right joining surfaces of said joint.

3. The vehicle body structure according to claim 1, wherein one of the left and right joining surfaces of said joint has a first bent portion aligned on the outer side in the vehicle width direction of the second skin main body of said outer skin, and a second bent portion aligned on the outer side in the vehicle width direction of the first skin main body of said inner skin.

4. The vehicle body structure according to claim 1, wherein at least one of said inner skin and said outer skin is formed to be thicker in an outer peripheral portion of said standing wall member than in other portions.

5. The vehicle body structure according to claim 1, wherein said standing member has a core interposed between said inner skin and said outer skin, and said core has a plurality of grooves extending in the vehicle width direction.

6. The vehicle body structure according to claim 1, wherein said side wall member has a hollow closed cross section.

7. The vehicle body structure according to claim 1, wherein said side wall member is a front pillar or a rear pillar, and has a protruding portion protruding outward in the front-rear direction from said joint, and the outer surface in the front-rear direction of said standing wall member and said protruding portion are connected to each other by a bracing member.

8. The vehicle body structure according to claim 7, wherein the floor panel has a first mounting surface which stands upward to cover the outer end in the front-rear direction of said side wall member, and a second mounting surface which extends inward in the vehicle width direction and inward in the front-rear direction from said first mounting surface and is joined to said bracing member, and an inner end in the front-rear direction of the side frame extending in the front-rear direction is fastened to said first mounting surface and said second mounting surface.

9. A vehicle body structure comprising:
a side wall member made of FRP, extending in a front-rear direction, and having an inner surface in a vehicle width direction;
a standing wall member made of FRP, extending in the vehicle width direction, and having an outer end in the vehicle width direction; and
a metallic joint configured to join the inner surface of the side wall member and the outer end of the standing wall member and having a substantially T-shaped cross section such that the metallic joint comprises,
a left joining surface and a right joining surface each joined to the inner surface of said side wall member, and
a front-rear joining surface which extends inward in the vehicle width direction from an intermediate portion in the front-rear direction of said left and right joining Surfaces and is joined to a front surface or a rear surface of the outer end of said standing wall member,
wherein said side wall member is a front pillar or a rear pillar, and has a protruding portion protruding outward in the front-rear direction from said joint, and the outer surface in the front-rear direction of said standing wall member and said protruding portion are connected to each other by a bracing member.

10. The vehicle body structure according to claim 9, wherein the floor panel has a first mounting surface which stands upward to cover the outer end in the front-rear direction of said side wall member, and a second mounting surface which extends inward in the vehicle width direction and inward in the front-rear direction from said first mounting surface and is joined to said bracing member, and an inner end in the front-rear direction of the side frame extending in the front-rear direction is fastened to said first mounting surface and said second mounting surface.

* * * * *